(12) United States Patent
Huang

(10) Patent No.: US 10,914,353 B2
(45) Date of Patent: Feb. 9, 2021

(54) MECHANICAL DISC BRAKE STRUCTURE

(71) Applicant: I-Cheng Huang, Lukang Township (TW)

(72) Inventor: I-Cheng Huang, Lukang Township (TW)

(*) Notice: Subject to any disclaimer, the term of this patent is extended or adjusted under 35 U.S.C. 154(b) by 53 days.

(21) Appl. No.: 16/360,088

(22) Filed: Mar. 21, 2019

(65) Prior Publication Data
US 2019/0293135 A1    Sep. 26, 2019

(30) Foreign Application Priority Data

Mar. 26, 2018 (TW) .............................. 107110347 A

(51) Int. Cl.
| | |
|---|---|
| *F16D 65/18* | (2006.01) |
| *F16D 55/26* | (2006.01) |
| *B62L 3/02* | (2006.01) |
| *F16D 55/226* | (2006.01) |
| *F16D 125/26* | (2012.01) |
| *F16D 55/00* | (2006.01) |

(52) U.S. Cl.
CPC ......... *F16D 65/183* (2013.01); *F16D 55/226* (2013.01); *B62L 3/02* (2013.01); *F16D 2055/0029* (2013.01); *F16D 2125/26* (2013.01)

(58) Field of Classification Search
CPC .... F16D 65/18; F16D 65/183; F16D 65/0973; F16D 55/226; F16D 55/228; F16D 2055/0029; F16D 2125/26; F16D 55/224; F16D 55/2245; B62L 3/02; B62L 1/005; B60T 11/046; B60T 11/04

USPC ..... 188/26, 72.7, 72.8, 72.9, 24.22, 28, 2 D, 188/344, 369, 370
See application file for complete search history.

(56) References Cited

U.S. PATENT DOCUMENTS

| | | | | |
|---|---|---|---|---|
| 3,425,520 | A * | 2/1969 | Frigger | F16D 65/18 188/71.9 |
| 4,487,295 | A * | 12/1984 | Mitchell | F16D 65/18 188/106 F |
| 5,000,294 | A * | 3/1991 | Hunnicutt | F16D 65/18 188/196 D |

(Continued)

FOREIGN PATENT DOCUMENTS

| | | | | |
|---|---|---|---|---|
| DE | 1430705 A1 * | 11/1968 | ........... | F16D 55/228 |
| TW | M489816 U | 11/2014 | | |

*Primary Examiner* — Thomas J Williams
(74) *Attorney, Agent, or Firm* — Alan D. Kamrath; Karin L. Williams; Mayer & Williams PC

(57) ABSTRACT

A mechanical disc brake structure contains: a body, a brake set, and a drive unit. The body includes two clamp seats between which an accommodation space is defined so as to accommodate a circular disc. The brake set contains: a rotation member includes a coupling column, a rotatable block, and a connection portion. The rotatable block has a push face, the rotation member includes a through aperture, and the stop fringe has a first retaining portion. The engagement member includes a braking disc having a forced face and a shaft. The shaft has a second retaining portion and a threaded orifice. An actuation structure is defined between the push face and the forced face. A torsion spring is accommodated in the through aperture. A screw element is screwed with the threaded orifice, and a locking member is locked with the rotation member.

8 Claims, 8 Drawing Sheets

(56) References Cited

U.S. PATENT DOCUMENTS

| | | | | |
|---|---|---|---|---|
| 6,148,964 A | * | 11/2000 | Huang | B62L 1/00 188/218 XL |
| 6,230,850 B1 | * | 5/2001 | Huang | B62L 1/00 188/24.12 |
| 2004/0011599 A1 | * | 1/2004 | Miles | F16D 65/18 188/24.22 |

* cited by examiner

MECHANICAL DISC BRAKE STRUCTURE

BACKGROUND OF THE INVENTION

Field of the Invention

The present invention relates to a disc brake structure, and more particularly to a mechanical disc brake structure.

Description of the Prior Art

Bicycles or sports equipment are traditionally using clip-on brakes, and their brake braking performance has failed to meet today's needs gradually. In order to improve the braking performance and safety of bicycles or sports equipment, more and more brake systems for bicycles or sports equipment use disc brakes. The current disc brakes are distinguished into two systems (i.e., mechanical and hydraulic systems) depending on the driving method. The mechanical disc brake relies on the tension of the brake wire to rub the brake pads in the caliper and clamp the disc to produce a braking effect. The hydraulic disc brake pulls the brake to actuate the piston inside the piston to compress the oil, and the pressure passes through the caliper from the oil pipe, thus pushing the piston in the caliper and driving the brake pad to hold the disc. The structure of the mechanical disc brake is simple and the manufacturing cost is low, so it is applicable bicycles or sports equipment.

A conventional double-drive disc brake mechanism (i.e., a mechanical disc brake mechanism) is disclosed in TW Publication No. M489816 and contains: a body, a first brake set, a second brake set, and a drive assembly configured to synchronously drive the first brake set and the second brake set to clamp a circular disc, wherein the body includes an accommodation space so as to accommodate the circular disc. The first brake set is disposed on a side of the body and has a movable disc, a fixed disc, and a brake lining relative to the accommodation space, wherein the movable disc includes a coupling column rotatably connected with the body, multiple arcuate recesses isometrically arranged on a surface of the movable disc opposite to the fixed disc, and a fixing portion formed on an end of the movable disc extending out of the body, wherein the fixing portion is secured on the drive assembly. Furthermore, a plurality of arcuate cutouts are formed on two opposite surfaces of the fixed disc and the movable disc respectively so as to engage with a ball, and the movable disc and the fixed disc move away or close to each other when the ball rotates. The fixed disc is driven by the movable disc and the ball to actuate the brake lining to move relative to the circular disc. The second brake set is fixed on the other side of the accommodation space of the body, and the second brake set has a movable disc, a fixed disc, and a brake lining relative to the accommodation space, wherein the movable disc includes a coupling column rotatably connected with the body, multiple arcuate recesses isometrically arranged on a surface of the movable disc opposite to the fixed disc, and a fixing portion formed on an end of the movable disc extending out of the body, wherein the fixing portion is secured on the drive assembly. Furthermore, a plurality of arcuate cutouts are formed on two opposite surfaces of the fixed disc and the movable disc respectively so as to engage with a ball, and the movable disc and the fixed disc move away or close to each other when the ball rotates. The fixed disc is driven by the movable disc and the ball to actuate the brake lining to move relative to the circular disc. The drive assembly is disposed on the body and has two connection orifices defined on two sides thereof respectively and corresponding to the two fixing portions of the two movable sides of the first brake set and the second brake sets individually so that the drive assembly actuates the two movable discs of the first and second brake sets. A torsion spring is defined between the drive assembly and the body so as to push the drive assembly to move back to an original position after the drive assembly rotates, and the drive assembly drives the two movable discs of the first and second brake sets to move back to two original positions respectively, thus braking the bicycle again.

However, the torsion spring of the conventional mechanical disc brake structure exposes outside, so dusts and foreign matters deposit on the torsion spring, and the torsion spring causes corrosion after a period of using time, thus reducing service life and using safety. The torsion spring is disposed on the side of the body and is turned continuously after rotating the drive assembly, thereafter the torsion spring is locked, thus having troublesome assembly of the conventional mechanical disc brake structure.

The present invention has arisen to mitigate and/or obviate the afore-described disadvantages.

SUMMARY OF THE INVENTION

The primary objective of the present invention is to provide a disc brake structure in which a torsion spring s accommodated in a through aperture of a rotation member so as to avoid dusts and objects depositing on the torsion spring and a corrosion of the torsion spring, thus operating the mechanical disc brake structure smoothly, prolonging a service life of the mechanical disc brake structure, and enhancing a safety of the mechanical disc brake structure.

Another objective of the present invention is to provide a disc brake structure in which the torsion spring is accommodated in the through aperture of the rotation member to connect with an engagement member, and a brake line pulls a drive unit to rotate the torsion spring, thus connecting the mechanical disc brake structure easily.

To obtain above-mentioned objectives, a disc brake structure provided by the present invention contains: a body, a brake set, and a drive unit.

The body includes two clamp seats between which an accommodation space is defined so as to accommodate a circular disc, the brake set is accommodated in the two clamp seats of the body, and the brake set is driven by the drive unit to clamp the circular disc.

The brake set contains: a rotation member, an engagement member, an actuation structure, a torsion spring, and a locking member.

The rotation member includes a coupling column rotatably connected on the body, a rotatable block formed on a first end of the coupling column, a connection portion extending from a second end of the coupling column and connected with the drive unit so that the drive unit drives the rotation member to rotate. The rotatable block has a push face formed on a side of the rotatable block adjacent to the accommodation space, the rotation member includes a through aperture defined in the rotation member and having a stop fringe formed on an end of the through aperture proximate to the push face, and the stop fringe has a first retaining portion.

The engagement member is fixed between the rotation member and the accommodation space and moves linearly but not rotates. The engagement member includes a braking disc, and the braking disc has a forced face formed on a side of the braking disc adjacent to the rotation member, and the braking disc has a shaft extending from a middle of the forced face and accommodated in the through aperture of the rotation member. The shaft has a second retaining portion arranged on an end of the shaft away from the braking disc, and the shaft has a threaded orifice formed on the end of the shaft adjacent to the second retaining portion.

The actuation structure is defined between the push face of the rotation member and the forced face of the engagement member so as to be actuated by the rotation member to move linearly.

The torsion spring is accommodated in the through aperture of the rotation member, two ends of the torsion spring are engaged with the first retaining portion of the rotation member and the second retaining portion of the engagement member, and a screw element is screwed with the threaded orifice of the shaft of the engagement member. The rotation member and the engagement member are connected by ways of the torsion spring, the forced face of the engagement member contacts with the push face of the rotation member, and the rotation member rotating and the engagement member move back to an original position by using the torsion spring.

The locking member is locked with the rotation member so that the rotation member does not remove from the two clamp seats of the body.

DETAILED DESCRIPTION OF THE PREFERRED EMBODIMENTS

The present invention will be clearer from the following description when viewed together with the accompanying drawings, which show, for purpose of illustrations only, a preferred embodiment in accordance with the present invention.

Figure 1:
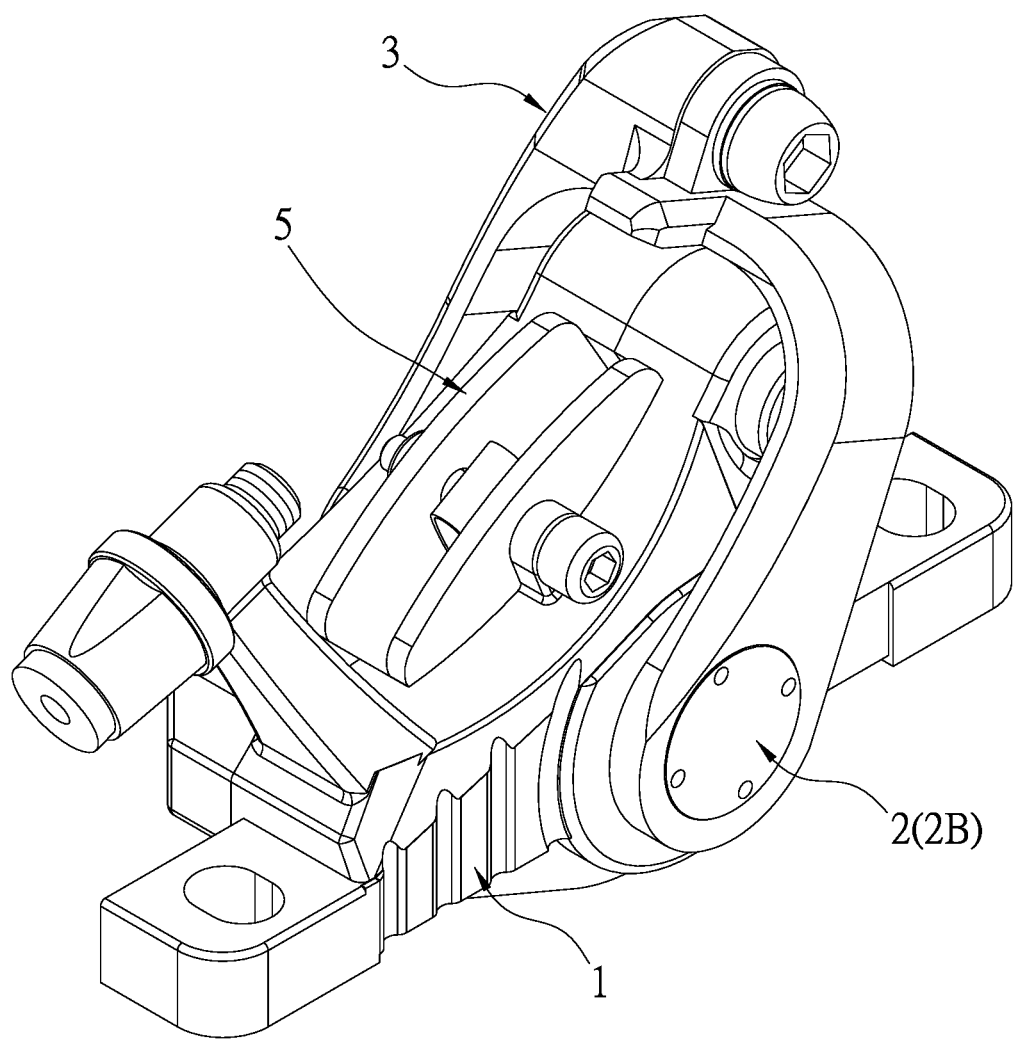
FIG. 1 is a perspective view showing the assembly of a disc brake structure according to a preferred embodiment of the present invention.
Figure 2:
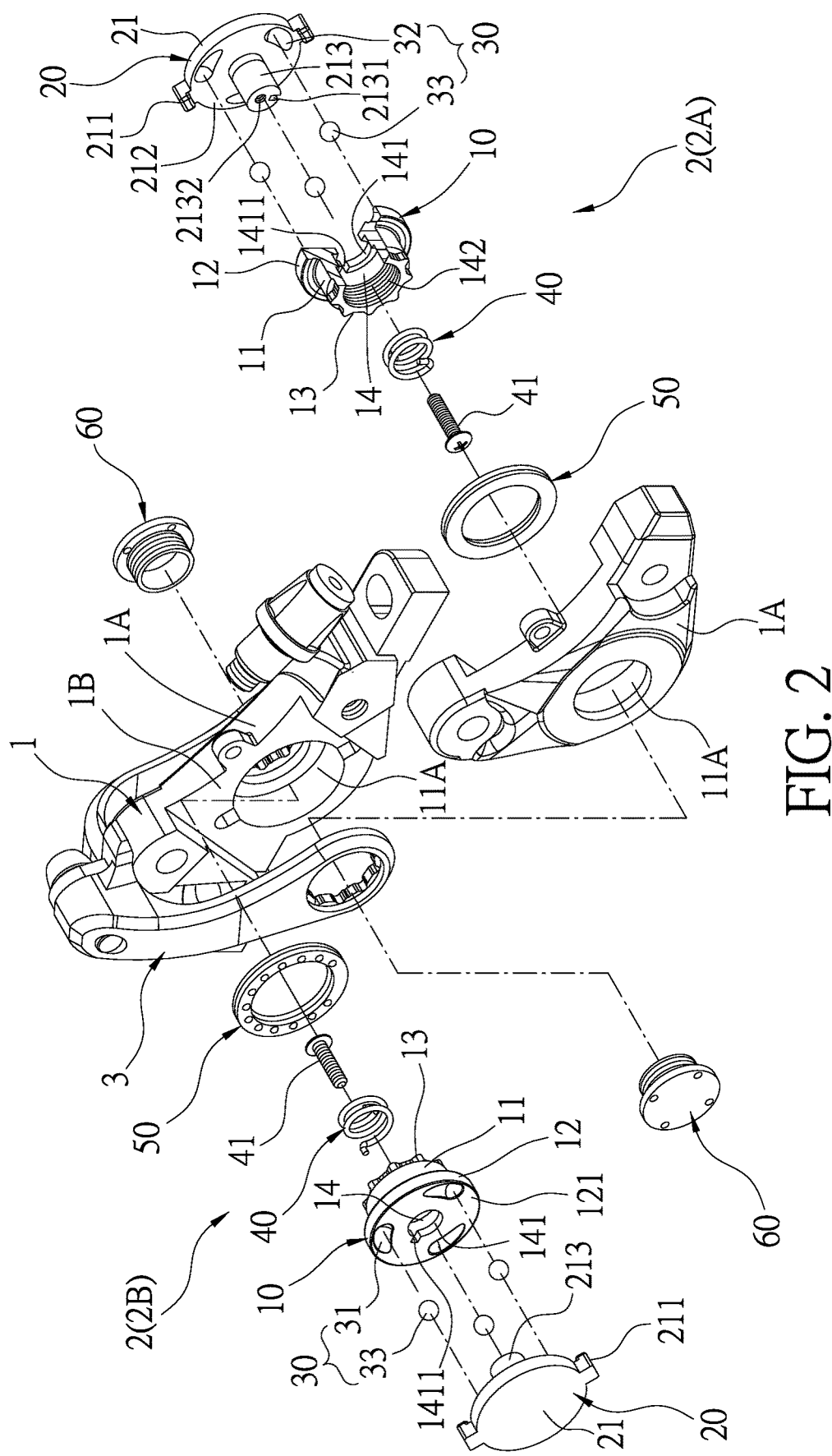
FIG. 2 is a perspective view showing the exploded components of the disc brake structure according to the preferred embodiment of the present invention.
Figure 3:
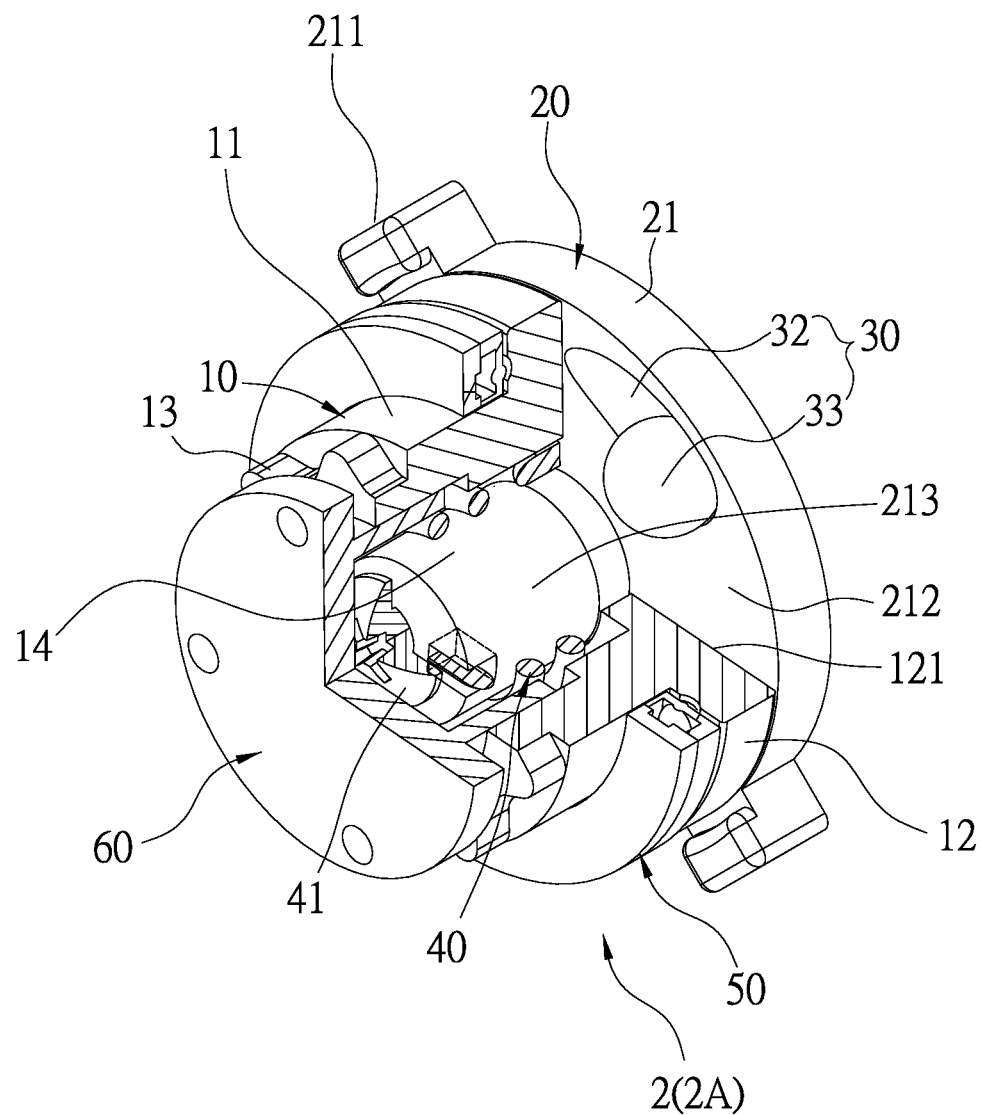
FIG. 3 is a cross-sectional perspective view showing the assembly of a part of the disc brake structure according to the preferred embodiment of the present invention.
Figure 4:
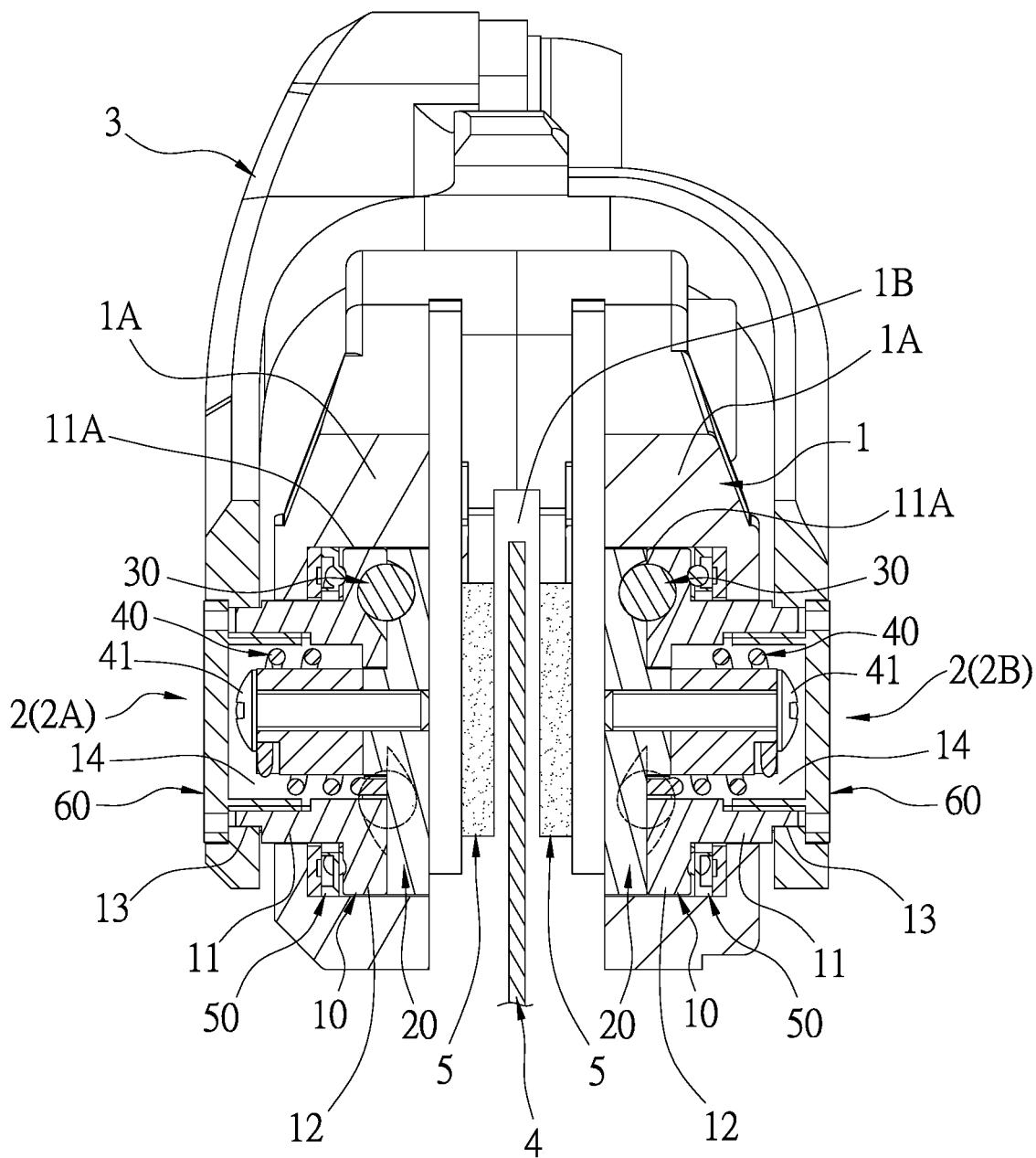
FIG. 4 is a cross sectional view showing the assembly of the disc brake structure according to the preferred embodiment of the present invention.

With reference to FIGS. 1-4, a mechanical disc brake structure according to a preferred embodiment of the present invention comprises: a body 1, at least one brake set 2, and a drive unit 3 (in this embodiment, the at least one brake set 2 includes a first brake set 2A and a second brake set 2B).

The body 1 includes two clamp seats 1A between which an accommodation space 1B is defined so as to accommodate a circular disc 4. The two clamp seats 1A have two receiving orifices 11A respectively, and the first brake set 2A is symmetrical to the second brake set 2B and is accommodated in the two receiving orifices 11A of the two clamp seats 1A.

The drive unit 3 is rotatably connected on the body 1 so as to synchronously drive the first brake set 2A and the second brake set 2B to clamp the circular disc 4.

The at least one brake set 2 (i.e., the first brake set 2A and the second brake set 2B) includes a rotation member 10, an engagement member 20, an actuation structure 30, a torsion spring 40, a bearing 50, and a locking member 60.

The rotation member 10 includes a coupling column 11 rotatably connected on the body 1, a rotatable block 12 formed on a first end of the coupling column 11, a polygonal connection portion 13 extending from a second end of the coupling column 11 and connected with the drive unit 3 so that the drive unit 3 drives the rotation member 10 to rotate. The rotatable block 12 has a push face 121 formed on a side thereof adjacent to the accommodation space 1B, the rotation member 10 includes a through aperture 14 defined therein and having a stop fringe 141 formed on an end of the through aperture 14 proximate to the push face 121, the stop fringe 141 has a first retaining portion 1411, and the through aperture 14 also has a screwing section 142 formed on the other end thereof away from the push face 121.

The engagement member 20 is fixed between the rotation member 10 and the accommodation space 1B, and the engagement member 20 includes a braking disc 21 having a limitation portion 211 arranged on an outer surface of the braking disc 21 so that the engagement member 20 moves linearly but not rotate. The braking disc 21 has a forced face 212 formed on a side thereof adjacent to the rotation member 10, and the braking disc 21 has a shaft 213 extending from a middle of the forced face 212 and accommodated in the through aperture 14 of the rotation member 10, wherein the shaft 213 has a second retaining portion 2131 arranged on an end thereof away from the braking disc 21, and the shaft 213 has a threaded orifice 2132 formed on the end thereof adjacent to the second retaining portion 2131.

The actuation structure 30 is defined between the push face 121 of the rotation member 10 and the forced face 212 of the engagement member 20. The actuation structure 30 includes multiple cutouts 31, multiple recesses 32, and multiple steel balls 33. The multiple cutouts 31 are located on the push face 121 and are arcuate, and the multiple cutouts 31 are slanted. The multiple recesses 32 are located on the forced face 212 and are arcuate, and the multiple recesses 32 are slanted. The multiple cutouts 31 correspond to the multiple recesses 32 individually, and the multiple steel balls 33 are defined among the multiple cutouts 31 and the multiple recesses 32 individually. When the rotation member 10 rotate, they actuate the multiple steel balls 33 to move among the multiple cutouts 31 and the multiple recesses 32 so that the multiple steel balls 33 push the engagement member 20 to move forward and backward linearly.

The torsion spring 40 is accommodated in the through aperture 14 of the rotation member 10, two ends of the torsion spring 40 are engaged with the first retaining portion 1411 of the rotation member 10 and the second retaining portion 2131 of the engagement member 20, and a screw element 41 is screwed with the threaded orifice 2132 of the shaft 213 of the engagement member 20, the rotation member 10 and the engagement member 20 are connected by ways of the torsion spring 40, the forced face 212 of the engagement member 20 contacts with the push face 121 of the rotation member 10, and the rotation member 10 rotates and the engagement member 20 moves back to an original position by using the torsion spring 40.

The bearing 50 is received between the rotatable block 12 of the rotation member 10 and the two clamp seats 1A of the body 1 so that the rotation member 10 rotates smoothly.

The locking member 60 is locked with the screwing section 142 of the rotation member 10 so that the rotation member 10 does not remove from the two receiving orifices 11A of the two clamp seats 1A of the body 1, and the shaft 213 of the engagement member 20 and the locking member 60 close the through aperture 14 of the rotation member 10.

Figure 5:
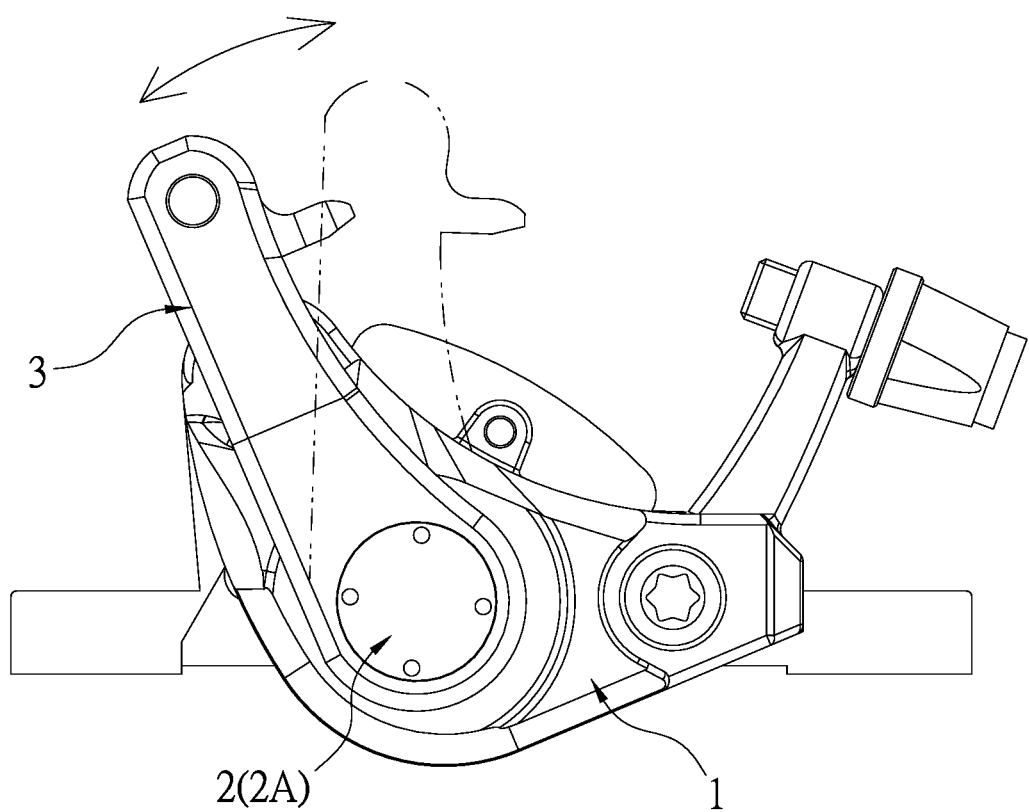
FIG. 5 is a side plan view showing the operation of the disc brake structure according to the preferred embodiment of the present invention.
Figure 6:
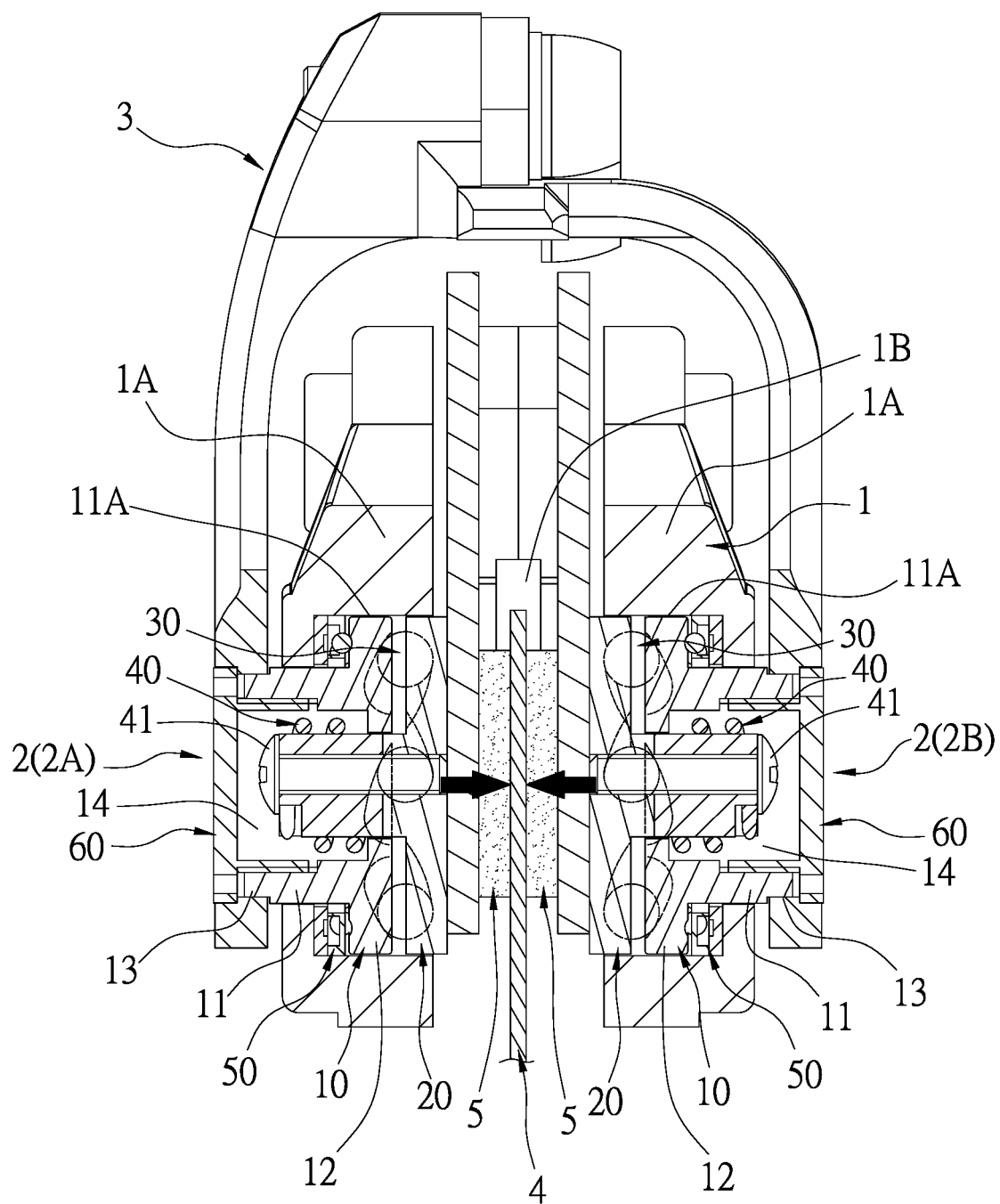
FIG. 6 is a cross sectional view showing the operation of the disc brake structure according to the preferred embodiment of the present invention.
Figure 7:
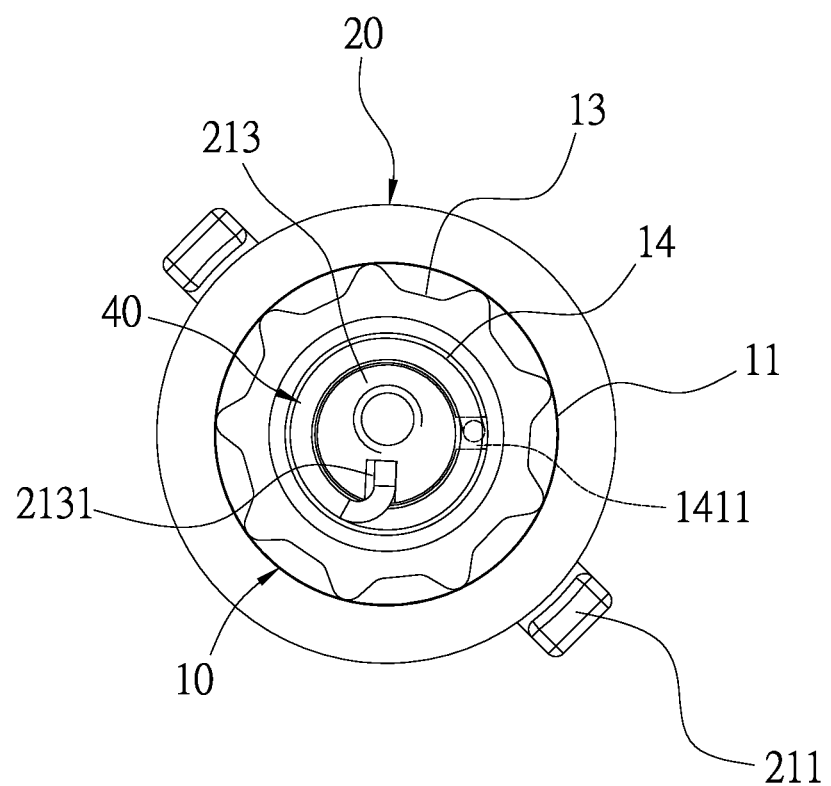
FIG. 7 is a side plan view showing the assembly of a part of the disc brake structure according to the preferred embodiment of the present invention.
Figure 8:
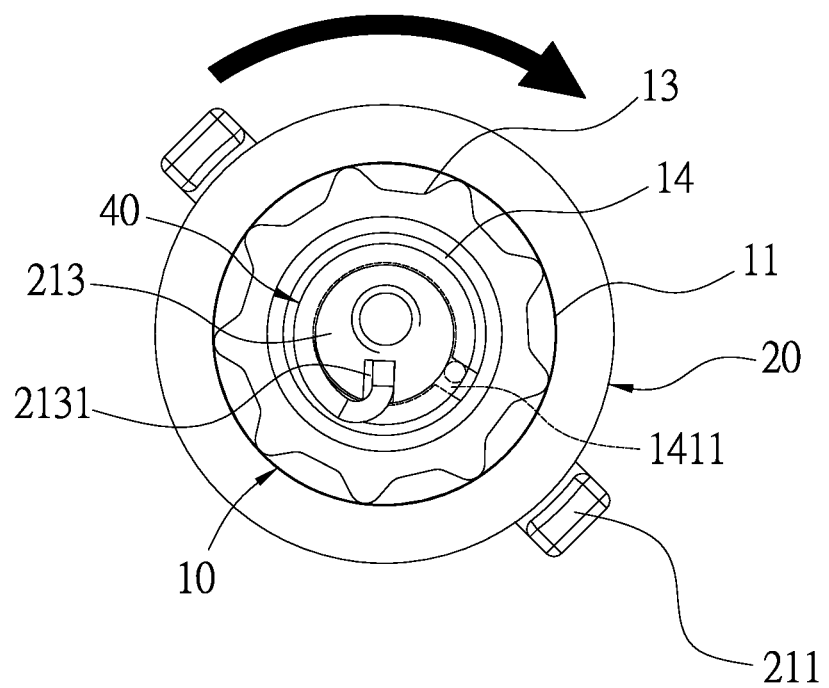
FIG. 8 is a side plan view showing the operation of a part of the disc brake structure according to the preferred embodiment of the present invention.

Referring to FIGS. 5-8, as desiring to lock the mechanical disc brake structure on a bicycle frame, a brake line of a bicycle is connected with the drive unit 3, and the engagement member 20 of the first brake set 2A and the second brake set 2B corresponds to a brake pad 5 of the circular disc 4. As braking the bicycle, the brake line pulls the drive unit 3 to rotate, the drive unit 3 actuates the rotation member 10 of the first brake set 2A and the second brake set 2B to rotate synchronously relative to the engagement member 20, and the multiple steel balls 33 of the actuation structure 30 move among the multiple cutouts 31 and the multiple recesses 32 to push the engagement member 20 and the brake pad 5 to move toward the circular disc 4, such that the torsion spring 40 turns and is pressed, and the engagement member 20 of the first brake set 2A and the second brake set 2B of the brake pad 5 clamps the circular disc 4, thus braking the bicycle.

As desiring to release braking of the bicycle, the torsion spring 40 urges the rotation member 10 and the drive unit 3 to move back to two original positions respectively, and the torsion spring 40 is pressed so that the engagement member 20 moves back to the original position with the multiple steel balls 33, thus braking the bicycle once more.

Accordingly, the mechanical disc brake structure of the present invention has advantages as follows:

1. The torsion spring 40 is accommodated in the through aperture 14 of the rotation member 10 so as to avoid dusts and objects depositing on the torsion spring 40 and a corrosion of the torsion spring 40, thus operating the mechanical disc brake structure smoothly, prolonging a service life of the mechanical disc brake structure, and enhancing a safety of the mechanical disc brake structure.

2. The torsion spring 40 is accommodated in the through aperture 14 of the rotation member 10 to connect with the engagement member 20, and the brake line pulls the drive unit 3 to rotate the torsion spring 40, thus connecting the mechanical disc brake structure easily.

While various embodiments in accordance with the present invention have been shown and described, it is clear to those skilled in the art that further embodiments may be made without departing from the scope of the present invention.

What is claimed is:

1. A mechanical disc brake structure comprising:
a body, a brake set, and a drive unit;
the body including two clamp seats between which an accommodation space is defined so as to accommodate a circular disc, the brake set being accommodated in the two clamp seats of the body, and the brake set being driven by the drive unit to clamp the circular disc;
the brake set comprising:
a rotation member including a coupling column rotatably connected on the body, a rotatable block formed on a first end of the coupling column, a connection portion extending from a second end of the coupling column and connected with the drive unit so that the drive unit drives the rotation member to rotate, the rotatable block having a push face formed on a side of the rotatable block adjacent to the accommodation space, the rotation member including a through aperture defined in the rotation member and having a stop fringe formed on an end of the through aperture proximate to the push face, and the stop fringe having a first retaining portion;
an engagement member being fixed between the rotation member and the accommodation space and moving linearly but not rotating, the engagement member including a braking disc, and the braking disc having a forced face formed on a side of the braking disc adjacent to the rotation member, and the braking disc having a shaft extending from a middle of the forced face and accommodated in the through aperture of the rotation member, the shaft having a second retaining portion arranged on an end of the shaft away from the braking disc, and the shaft having a threaded orifice formed on the end of the shaft adjacent to the second retaining portion;
an actuation structure defined between the push face of the rotation member and the forced face of the engagement member so as to be actuated by the rotation member to move linearly;
a torsion spring accommodated in the through aperture of the rotation member, two ends of the torsion spring being engaged with the first retaining portion of the rotation member and the second retaining portion of the engagement member, and a screw element being screwed with the threaded orifice of the shaft of the engagement member, the rotation member and the engagement member being connected by way of the torsion spring, the forced face of the engagement member contacting with the push face of the rotation member, and the rotation member rotating and the engagement member moving back to an original position by using the torsion spring; and
a locking member locked with the rotation member so that the rotation member does not remove from the two clamp seats of the body.

2. The mechanical disc brake structure as claimed in claim 1, wherein the through aperture has a screwing section formed on the other end thereof away from the push face so as to screw with the locking member.

3. The mechanical disc brake structure as claimed in claim 1, wherein the actuation structure includes multiple cutouts, multiple recesses, and multiple steel balls; the multiple cutouts are located on the push face and are arcuate, and the multiple cutouts are slanted, the multiple recesses are located on the forced face and are arcuate, and the multiple recesses are slanted, the multiple cutouts correspond to the multiple recesses individually, and the multiple steel balls are defined among the multiple cutouts and the multiple recesses individually, wherein when the rotation member rotates, the rotation member actuates the multiple steel balls to move among the multiple cutouts and the multiple recesses so that the multiple steel balls push the engagement member to move forward and backward linearly.

4. The mechanical disc brake structure as claimed in claim 1, wherein the brake set includes a bearing received between the rotatable block of the rotation member and the two clamp seats of the body.

5. A mechanical disc brake structure comprising:

a body, a first brake set, a second brake set, and a drive unit;

the body including two clamp seats between which an accommodation space is defined so as to accommodate a circular disc, the first and second brake sets being accommodated in the two clamp seats of the body respectively, and the first and second brake sets being driven by the drive unit to clamp the circular disc;

the first brake set being symmetrical to the second brake set, and the first and second brake sets respectively comprising:

a rotation member including a coupling column rotatably connected on the body, a rotatable block formed on a first end of the coupling column, a connection portion extending from a second end of the coupling column and connected with the drive unit so that the drive unit drives the rotation member to rotate, the rotatable block having a push face formed on a side of the rotatable block adjacent to the accommodation space, the rotation member including a through aperture defined in the rotation member and having a stop fringe formed on an end of the through aperture proximate to the push face, and the stop fringe having a first retaining portion;

an engagement member being fixed between the rotation member and the accommodation space and moving linearly but not rotating, the engagement member including a braking disc, and the braking disc having a forced face formed on a side of the braking disc adjacent to the rotation member, and the braking disc having a shaft extending from a middle of the forced face and accommodated in the through aperture of the rotation member, the shaft having a second retaining portion arranged on an end of the shaft away from the braking disc, and the shaft having a threaded orifice formed on the end of the shaft adjacent to the second retaining portion;

an actuation structure defined between the push face of the rotation member and the forced face of the engagement member so as to be actuated by the rotation member to move linearly;

a torsion spring accommodated in the through aperture of the rotation member, two ends of the torsion spring being engaged with the first retaining portion of the rotation member and the second retaining portion of the engagement member, and a screw element being screwed with the threaded orifice of the shaft of the braking disc, the rotation member and the engagement member being connected by way of the torsion spring, the forced face of the engagement member contacting with the push face of the rotation member, and the rotation member rotating and the engagement member moving back to an original position by using the torsion spring; and a locking member locked with the rotation member so that the rotation member does not remove from the two clamp seats of the body.

6. The mechanical disc brake structure as claimed in claim 5, wherein the through aperture has a screwing section formed on the other end thereof away from the push face so as to screw with the locking member.

7. The mechanical disc brake structure as claimed in claim 5, wherein the actuation structure includes multiple cutouts, multiple recesses, and multiple steel balls; the multiple cutouts are located on the push face and are arcuate, and the multiple cutouts are slanted, the multiple recesses are located on the forced face and are arcuate, and the multiple recesses are slanted, the multiple cutouts correspond to the multiple recesses individually, and the multiple steel balls are defined among the multiple cutouts and the multiple recesses individually, wherein when the rotation member rotates, the rotation member actuates the multiple steel balls to move among the multiple cutouts and the multiple recesses so that the multiple steel balls push the engagement member to move forward and backward linearly.

8. The mechanical disc brake structure as claimed in claim 5, wherein each of the first and second brake set includes a bearing received between the rotatable block of the rotation member and the two clamp seats of the body.

* * * * *